(12) United States Patent
Kamijima et al.

(10) Patent No.: US 7,311,850 B2
(45) Date of Patent: Dec. 25, 2007

(54) METHOD OF FORMING PATTERNED THIN FILM AND METHOD OF FABRICATING MICRO DEVICE

(75) Inventors: Akifumi Kamijima, Tokyo (JP); Yoichi Ishida, Tokyo (JP); Koichi Terunuma, Tokyo (JP)

(73) Assignee: TDK Corporation, Tokyo (JP)

( * ) Notice: Subject to any disclaimer, the term of this patent is extended or adjusted under 35 U.S.C. 154(b) by 422 days.

(21) Appl. No.: 10/271,590

(22) Filed: Oct. 17, 2002

(65) Prior Publication Data

US 2003/0080084 A1    May 1, 2003

(30) Foreign Application Priority Data

Nov. 1, 2001    (JP) .............................. 2001-336871

(51) Int. Cl.
*H01L 21/027*    (2006.01)

(52) U.S. Cl. ............................ 216/22; 216/40; 216/41; 216/46; 216/49; 216/67; 216/72; 216/79; 438/696; 438/701; 438/739; 438/947

(58) Field of Classification Search ................. 216/22, 216/40–41, 49, 67, 72; 430/313, 320, 322–323, 430/325, 328; 29/603.07
See application file for complete search history.

(56) References Cited

U.S. PATENT DOCUMENTS

| | | | | |
|---|---|---|---|---|
| 4,144,101 A | * | 3/1979 | Rideout | 438/526 |
| 4,805,683 A | * | 2/1989 | Magdo et al. | 216/40 |
| 5,185,293 A | * | 2/1993 | Franke et al. | 438/606 |
| 5,369,061 A | * | 11/1994 | Nagayama | 438/696 |
| 5,469,489 A | * | 11/1995 | Miyake et al. | 378/35 |
| 5,665,251 A | * | 9/1997 | Robertson et al. | 216/22 |
| 5,721,078 A | | 2/1998 | Kamijima | 430/11 |
| 5,725,997 A | | 3/1998 | Kamijima | 430/325 |
| 5,747,198 A | | 5/1998 | Kamijima | 430/11 |
| 5,773,200 A | | 6/1998 | Okazaki et al. | 430/324 |
| 6,218,056 B1 | * | 4/2001 | Pinarbasi et al. | 430/5 |
| 6,624,080 B2 | * | 9/2003 | Jung et al. | 438/706 |
| 7,007,374 B2 | * | 3/2006 | Lille | 29/603.16 |
| 7,178,222 B2 | * | 2/2007 | Hasegawa | 29/603.13 |
| 2001/0016300 A1 | * | 8/2001 | Iwata et al. | 430/314 |
| 2002/0139773 A1 | * | 10/2002 | Gabriel et al. | 216/62 |
| 2003/0003408 A1 | * | 1/2003 | Lee et al. | 430/330 |

FOREIGN PATENT DOCUMENTS

| | | |
|---|---|---|
| EP | 0 341 843 A2 | 11/1989 |
| JP | 56093328 A * | 7/1981 |

(Continued)

*Primary Examiner*—Anita Alanko
(74) *Attorney, Agent, or Firm*—Oliff & Berridge, PLC

(57) ABSTRACT

In a method of forming a patterned thin film, first, an etching stopper film and a film to be patterned are formed in this order on a base layer. Next, a patterned first film is formed on the film to be patterned. Next, a second film is formed over an entire surface on top of the film to be patterned and the first film. Then, by removing the first film, an etching mask is obtained from the second film formed on the film to be patterned. The film to be patterned is selectively etched through dry etching using the etching mask. A patterned thin film having a groove is thereby obtained.

17 Claims, 16 Drawing Sheets

FOREIGN PATENT DOCUMENTS

| | | | |
|---|---|---|---|
| JP | 01059918 A * | 3/1989 | |
| JP | A 2-17643 | 1/1990 | |
| JP | A-6-69242 | 3/1994 | |
| JP | 07-044820 A * | 2/1995 | |
| JP | A-7-44820 | 2/1995 | |
| JP | A-7-183315 | 7/1995 | |
| JP | A 8-69111 | 3/1996 | |
| JP | A 8-78414 | 3/1996 | |
| JP | A 9-96909 | 4/1997 | |
| JP | A-10-321622 | 12/1998 | |

* cited by examiner

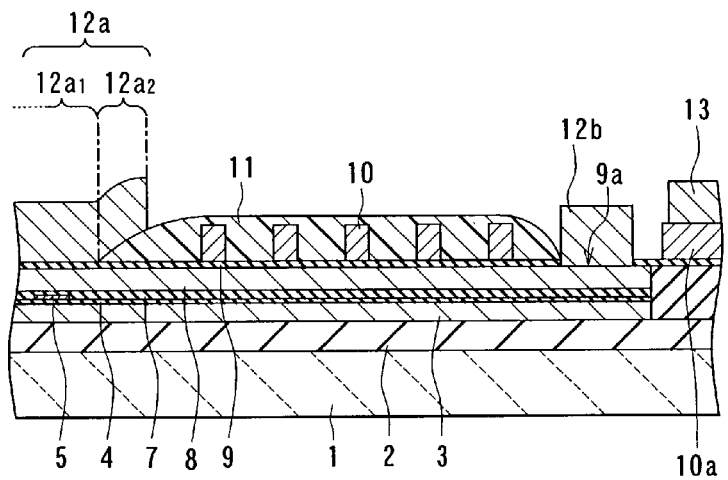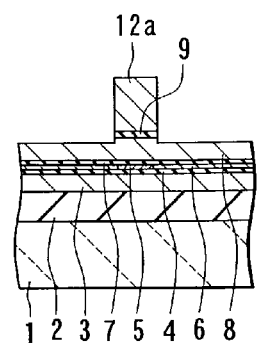
FIG. 13A  FIG. 13B
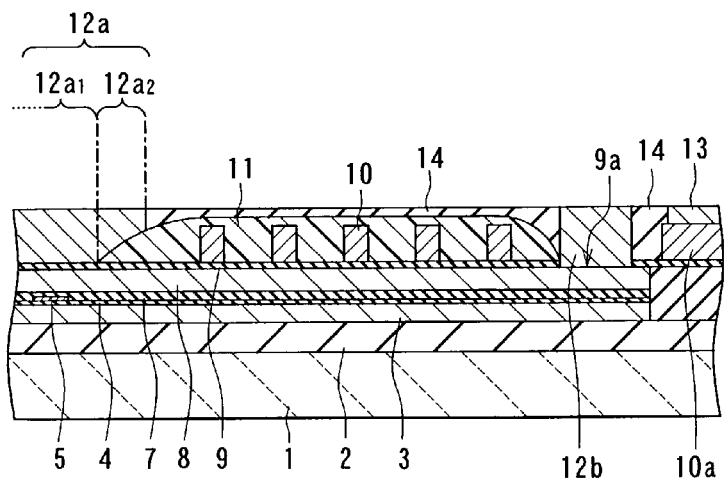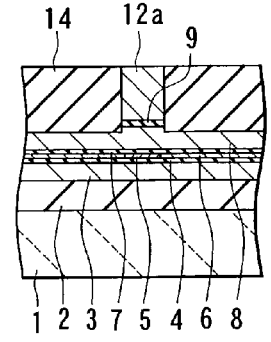
FIG. 14A  FIG. 14B

METHOD OF FORMING PATTERNED THIN FILM AND METHOD OF FABRICATING MICRO DEVICE

BACKGROUND OF THE INVENTION

1. Field of the Invention

The present invention relates to a method of forming a patterned thin film and a method of fabricating a micro device in which a patterned thin film is formed through dry etching.

2. Description of the Related Art

For micro devices incorporating a thin film formed into a specific pattern (called a patterned thin film in this application), one of methods for forming the patterned thin film is to employ dry etching. A micro device means a small-size device fabricated through the use of thin-film forming techniques. Examples of micro devices include semiconductor devices, thin-film magnetic heads, transducers and actuators incorporating thin films.

Conventional methods for forming a patterned thin film having a narrow groove through dry etching include the one disclosed in Published Unexamined Japanese Patent Application (KOKAI) Heisei 8-78414 (1996). This method will now be described briefly with reference to FIG. 28 to FIG. 33.

In this method, first, as shown in FIG. 28, an etching stopper film 302 and a film 303 to be patterned are formed in this order on a base layer 301 as a substrate through sputtering or the like. Next, as shown in FIG. 29, an etching mask layer 304 is formed through sputtering or the like on the film 303 to be patterned.

Next, as shown in FIG. 30, a patterned photoresist layer 305 is formed on the etching mask layer 304 through photolithography. The photoresist layer 305 has an opening 305a at a position corresponding to a groove that will be formed later in the film 303.

Next, as shown in FIG. 31, the etching mask layer 304 is selectively etched through dry etching such as reactive ion etching and ion milling using the photoresist layer 305 as a mask. Next, as shown in FIG. 32, the photoresist layer 305 is removed through the use of a solvent or through ashing. The etching mask layer 304 is thereby patterned, and an etching mask 306 to be used for patterning the film 303 is thus obtained.

Next, as shown in FIG. 33, the film 303 is selectively etched through, for example, reactive ion etching using the etching mask 306. The film 303 is thereby patterned into a patterned thin film 307 having a groove 307a.

Incidentally, as shown in FIG. 34, when another thin film 308 is formed on the patterned thin film 307 during the fabrication process of a micro device, there are cases where the thin film 308 need to adhere to end portions 307b of the patterned thin film 307 as well, the end portions facing the groove 307a. The thin film 308 may be an interlayer insulation film, for example.

However, in the case of the patterned thin film 307 formed by the method shown in FIG. 28 through FIG. 33, the end portions 307b are formed to be almost vertical with respect to the top surface of the base layer 301. In this case, as shown in FIG. 34, there arises a problem that the thin film 308 adhering to the end portions 307b is small in volume. Where the thin film 308 is to serve as an interlayer insulation film, an insulation failure may occur if the film 308 adhering to the end portions 307b is too small in volume.

For the patterned thin film 307 formed by the method shown in FIG. 28 through FIG. 33, on the other hand, the width of the groove 307a depends on the width of the opening 305a in the photoresist layer 305 patterned through photolithography. This poses an optical limit for attaining a smaller width of the groove 307a, that is, the width of the groove 307a cannot be reduced beyond this limit.

OBJECT AND SUMMARY OF THE INVENTION

It is an object of the invention to provide a method of forming a patterned thin film and a method of fabricating a micro device, which make it possible to obtain a patterned thin film having a groove of extremely small width and to attain good adhesion of another thin film to the end portions of the patterned thin film facing the groove.

A method of forming a patterned thin film according to the invention comprises the steps of: forming a film to be patterned on a base layer; forming a patterned first film on the film to be patterned; forming a second film over an entire surface on top of the film to be patterned and the first film; obtaining an etching mask from the second film formed on the film to be patterned, by removing the first film; and forming a patterned thin film by selectively etching the film to be patterned, through dry etching using the etching mask.

According to the method of forming a patterned thin film of the invention, a patterned thin film is formed as follows. First, the film to be patterned is formed on the base layer. Next, the patterned first film is formed on the film to be patterned. Next, the second film is formed over the entire surface on top of the film to be patterned and the first film. Next, the first film is removed to thereby obtain the etching mask from the second film formed on the film to be patterned. Next, the film to be patterned is selectively etched through dry etching using the etching mask, to thereby obtain the patterned thin film.

In the method of forming a patterned thin film of the invention, the etching mask may have an opening at a position where the first film was present, and the end portions of the etching mask facing the opening may have diagonally upward slopes. The patterned thin film formed by using this etching mask has a groove at a position corresponding to the opening of the etching mask. The end portions of the patterned thin film facing this groove form diagonally upward slopes. In this application, "upward" means a direction along which the patterned thin film is placed as viewed from the base layer.

In the method of forming a patterned thin film of the invention, the first film may be formed by patterning a single resist layer made of a negative type resist in the step of forming the first film. In this case, the negative type resist may be a chemically amplified type resist. The first film may have sidewalls on which irregularities are formed due to a standing wave effect. The method of forming a patterned thin film of the invention may further comprise the step of reducing the first film in width, the step being interposed between the step of forming the first film and the step of forming the second film. The first film may be subjected to ashing in the step of reducing the first film in width.

In the method of forming a patterned thin film of the invention, the film to be patterned may be selectively etched through reactive ion etching in the step of forming a patterned thin film.

In the method of forming a patterned thin film of the invention, it is preferable that an etching rate for the etching mask when the film to be patterned is etched is smaller than an etching rate for the film to be patterned.

A method of fabricating a micro device according to the invention is provided for fabricating a micro device including one or more patterned thin films, in which the patterned thin film(s) are formed by the above-described method of forming a patterned thin film of the invention.

In the method of fabricating a micro device of the invention, the micro device may be a thin-film magnetic head. In this case, the thin-film magnetic head may include a magnetoresistive element and lead layers connected to the magnetoresistive element, and the patterned thin film may form the lead layers.

Other and further objects, features and advantages of the invention will appear more fully from the following description.

BRIEF DESCRIPTION OF THE DRAWINGS

FIGS. 13A and 13B are cross sections for illustrating a step that follows the step shown in FIGS. 12A and 12B.

FIGS. 14A and 14B are cross sections for illustrating a step that follows the step shown in FIGS. 13A and 13B.

DETAILED DESCRIPTION OF THE PREFERRED EMBODIMENT

A preferred embodiment of the invention will now be described in detail with reference to the accompanying drawings. First, a method of forming a patterned thin film according to the embodiment will be described with reference to FIG. 1 through FIG. 6.

Figure 1:
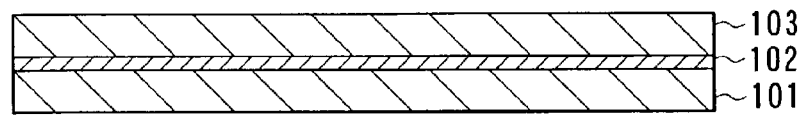
FIG. 1 is a cross section for illustrating a step of a method of forming a patterned thin film according to an embodiment of the invention.

In the method of forming a patterned thin film according to the embodiment, as shown in FIG. 1, an etching stopper film 102 and a film 103 to be patterned are first formed in this order on a base layer 101 such as a substrate through sputtering or the like. The etching stopper film 102 can be dispensed with, however.

Figure 2:
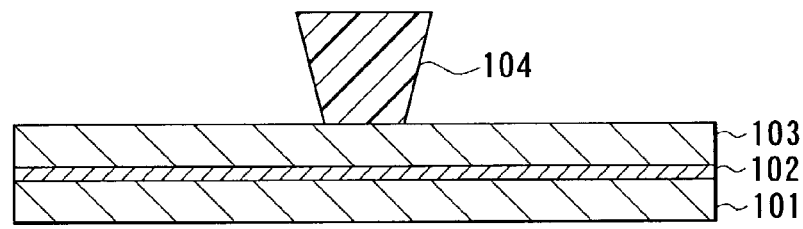
FIG. 2 is a cross section for illustrating a step that follows the step shown in FIG. 1.

Next, as shown in FIG. 2, a patterned first film 104 is formed on the film 103 to be patterned. The first film 104 is formed by, for example, patterning a resist through photolithography. In this case, the resist can be either of a positive type or a negative type. The first film 104 may be a film having a rectangular cross section, or a trapezoidal cross section in which the upper part is smaller in width than the lower part, or may be a film having an undercut shape. However, because the first film 104 is to be removed through lift-off in a later step, it is preferable to employ a film having an undercut shape.

The film having an undercut shape may be a film whose cross section is such that the lower part is smaller in width than the upper part. Such a film can be formed through the use of a resist having an image reversal function, as disclosed in U.S. Pat. No. 5,725,997.

The film having an undercut shape may be a film that includes an upper layer having a specific width, and a lower layer having a width smaller than the width of the upper layer. Such a film can be formed through the use of a two-layer resist, as disclosed in EP 0341843 A2.

The film having an undercut shape may be a film having a narrowed portion near the bottom thereof. Such a film can be formed through the use of a resist layer with a microgroove, as disclosed in U.S. Pat. No. 5,773,200.

For convenience, in FIG. 2 and the subsequent drawings, the first film 104 is shown as a film having a trapezoidal cross section in which the lower part is smaller in width than the upper part.

Figure 3:
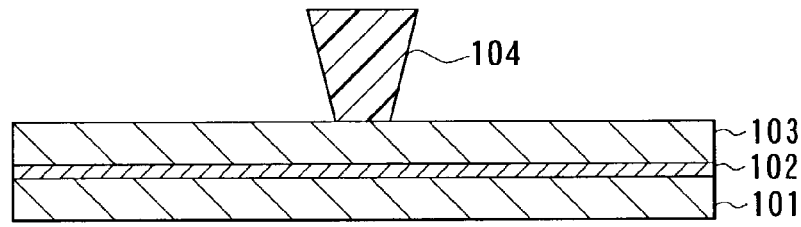
FIG. 3 is a cross section for illustrating a step that follows the step shown in FIG. 2.

Next, as shown in FIG. 3, the first film 104 is reduced in width. The reduction in width is achieved by, for example, subjecting the first film 104 to ashing. Ashing is a treatment to remove a material such as a resist in a vapor phase. To be more specific, ashing is performed by exposing a material such as a resist to plasma of oxygen, ozone, etc.

Figure 4:
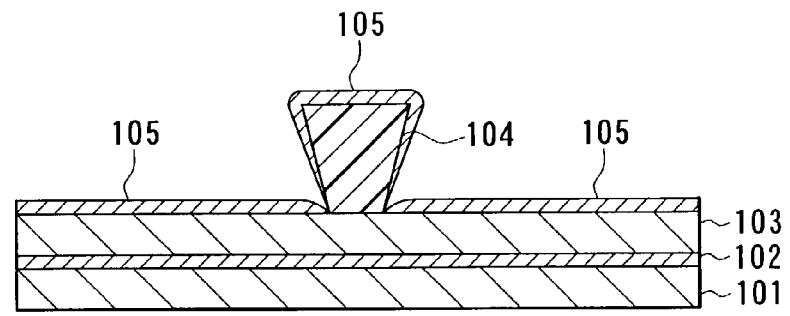
FIG. 4 is a cross section for illustrating a step that follows the step shown in FIG. 3.

Next, as shown in FIG. 4, a second film 105 is formed over the entire surface on top of the film 103 and the first film 104 through sputtering or the like. The second film 105 may be either a single-layer film or a multi-layer film.

Figure 5:
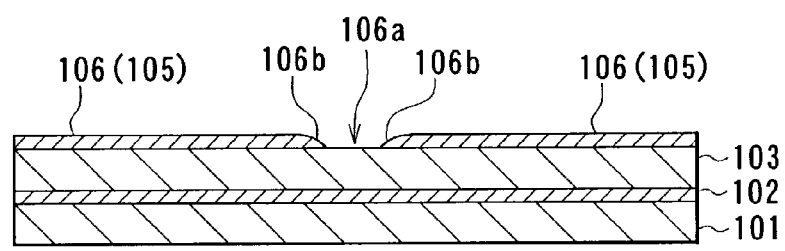
FIG. 5 is a cross section for illustrating a step that follows the step shown in FIG. 4.

Next, as shown in FIG. 5, the first film 104 is lifted off (removed) by, for example, immersing the laminate including the layers from the base layer 101 to the second film 105 in an organic solvent. An etching mask 106 is thereby obtained from the second film 105 formed on the film 103. The etching mask 106 has an opening 106a at a position where the first film 104 was present.

As has been described, in this embodiment, the etching mask 106 is formed on the film 103 through the lift-off method. For this reason, end portions 106b of the etching mask 106 facing the opening 106a form diagonally upward slopes.

Figure 6:
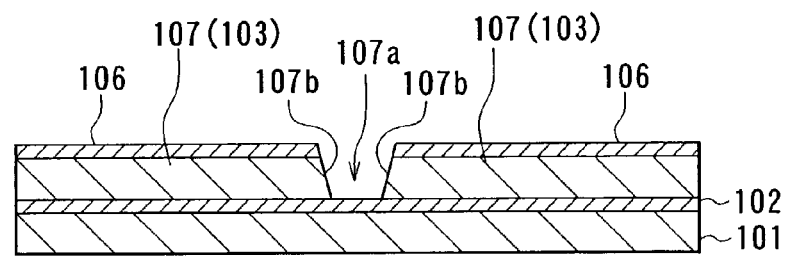
FIG. 6 is a cross section for illustrating a step that follows the step shown in FIG. 5.

Next, as shown in FIG. 6, the film 103 is selectively etched through dry etching such as reactive ion etching using the etching mask 106. A patterned thin film 107 is thereby obtained from the remaining part of the film 103. The patterned thin film 107 has a groove 107a at a position corresponding to the opening 106a of the etching mask 106.

Because the end potions 106b of the etching mask 106 form diagonally upward slopes as described above, the opening 106a of the etching mask 106 widens gradually while the film 103 is being etched. As a result, end portions 107b of the patterned thin film 107 facing the groove 107a also form diagonally upward slopes.

In this embodiment, it is preferable that an etching rate for the etching mask 106 when the film 103 is etched is smaller than an etching rate for the film 103.

In the case shown in FIG. 6, etching of the film 103 is continued until the bottom of the patterned thin film 107 is leveled with the top surface of the etching stopper film 102. Following the etching of the film 103, however, the etching stopper film 102 may be etched halfway along the direction of its thickness or all the way to its bottom. A point at which the etching is to be stopped can be controlled through, for example, performing measurements to identify elements scattered due to the etching by secondary ion analysis or the like, while etching.

In this embodiment, in the step of forming the first film 104, it is preferable that the first film 104 is formed by patterning a single resist layer made of a negative type resist. The reason follows. When a single resist layer made of a negative type resist is patterned through photolithography, part of the resist layer that will be left to form the first film 104 is subjected to exposure. In the exposed part of the resist layer, the upper portion has a higher degree of cross-linking. Hence, when the resist layer is developed following the exposure, the first film 104 having a trapezoidal cross section in which the lower part is smaller in width than the upper part is obtained. Thus, by employing the above-described method of forming the first film 104, i.e., by patterning a single resist layer of a negative type resist, it is possible to obtain the first film 104 having an undercut shape suitable for lift-off more easily than by other methods.

It is also preferable that the negative type resist is a chemically amplified type resist. The reason follows. Firstly, a chemically amplified type resist has a high resolution. Secondly, a chemically amplified type resist has such a good heat resistance that its shape is hardly deformed by ashing. For these reasons, use of a chemically amplified negative type resist allows formation of the first film 104 having a small width.

Figure 7:
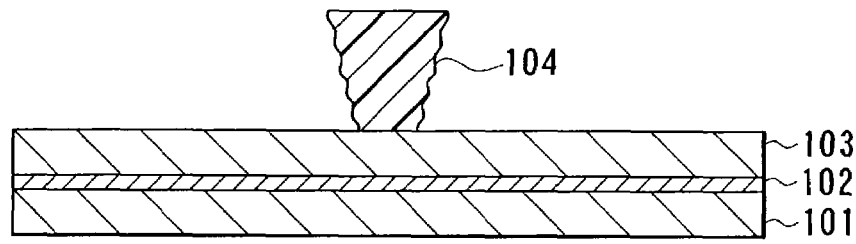
FIG. 7 is a cross section for illustrating an example of a shape of a first film in the embodiment of the invention.

When the first film 104 is formed by patterning a single resist layer of a negative type resist, as shown in FIG. 7, the first film 104 may have sidewalls which have irregularities resulting from the standing wave effect. The standing wave effect refers to a phenomenon in which irregularities develop on the sidewalls of a patterned resist layer, which is caused by a standing wave generated by interference between light incident upon the resist layer and light reflected off the base layer underlying the resist layer when the resist layer is subjected to exposure.

Figure 8:
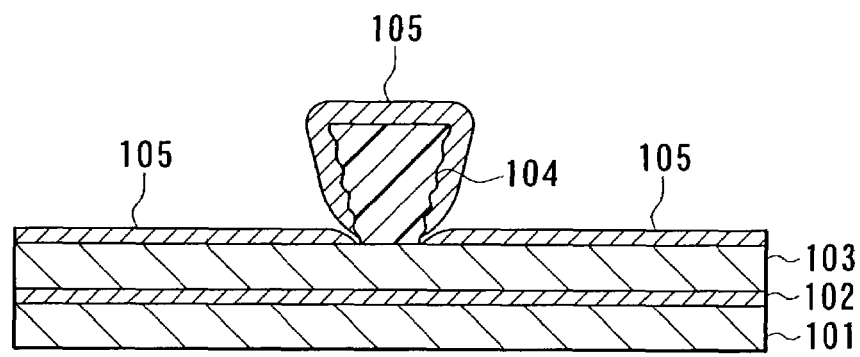
FIG. 8 is a cross section showing a state where a second film is formed on the laminate shown in FIG. 7.

When the sidewalls of the first film 104 have irregularities due to the standing wave effect, as shown in FIG. 8, the second film 105 easily adheres to the sidewalls of the first film layer 104 when the second film 105 is formed. Hence, in this case, when the second film 105 is formed, a film made up of the first film 104 and the second film 105 adhering to the sidewalls of the first film 104 becomes greater in width as compared with the case where the first film 104 has smooth sidewalls. As a result, it becomes quite easy to lift off the film made up of the first film 104 and the second film 105 adhering to the sidewalls thereof.

When the sidewalls of the first film 104 have irregularities due to the standing wave effect, in the process of formation of the second thin film 105, deposition of the second film 105 onto the film 103 proceeds while the second film 105 adheres to the sidewalls of the first film 104. Hence, the film made up of the first film 104 and the second film 105 adhering to the sidewalls of the first film 104 is becoming greater in width while the second film 105 is being deposited onto the film 103. Accordingly, an angle formed by the diagonally upward slope of each end portion 106b of the etching mask 106 formed through the lift-off method with respect to the top surface of the film 103 that underlies the etching mask 106 can be made smaller than in the case where the first film 104 has smooth sidewalls.

As has been described, in this embodiment, the etching mask 106 is formed on the film 103 through the lift-off method. For this reason, the end portions 106b of the etching mask 106 facing the opening 106a form diagonally upward slopes. Then, the patterned thin film 107 is obtained by selectively etching the film 103 through dry etching using the etching mask 106. As a result, the end portions 107b of the patterned thin film 107 facing the groove 107a form diagonally upward slopes. Thus, the embodiment provides the patterned thin film 107 that attains good adhesion of another thin film to the end portions 107b facing the groove 107a.

Furthermore, when the sidewalls of the first film 104 have irregularities due to the standing wave effect, the angle formed by the diagonally upward slope of each end portion 106b of the etching mask 106 formed through the lift-off method with respect to the top surface of the film 103 that underlies the etching mask 106 can be made smaller than in the case where the first film 104 has smooth sidewalls. In this case, it is possible to attain a smaller angle that is formed by the diagonally upward slope of each end portion 107b of the patterned thin film 107 obtained using the etching mask 106 with respect to the top surface of the base layer 101 underlying the patterned thin film 107 or the top surface of the etching stopper film 102, as compared to the case where the first film 104 has smooth sidewalls. Accordingly, in this case, it is possible to obtain the patterned thin film 107 that attains good adhesion of another thin film to the end portions 107b facing the groove 107a.

Figure 9:
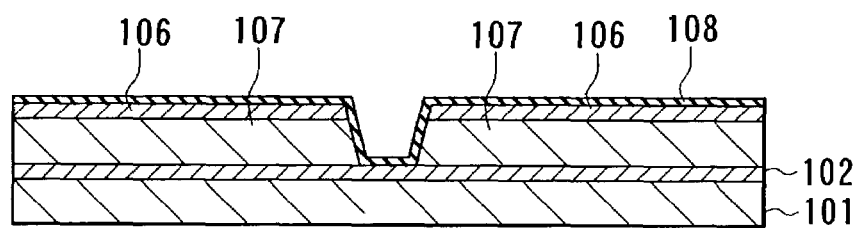
FIG. 9 is a cross section showing a state where another thin film is formed on the laminate shown in FIG. 6.

FIG. 9 shows a state where another thin film 108 is formed on the patterned thin film 107. As shown in FIG. 9, the embodiment allows the thin film 108 to sufficiently adhere also to the end portions 107b facing the groove 107a. This makes it possible to prevent occurrences of insulation failure where the thin film 108 is to serve as an interlayer insulation film.

In this embodiment, the width of the groove 107a of the patterned thin film 107 depends on the width of the opening 106a of the etching mask 106. The width of the opening 106a depends on the width of the first film 104. The width of the first film 104 can be easily made smaller beyond the optical limit through a narrowing treatment by ashing, for example. Hence, according to the embodiment, it is easy to form the patterned thin film 107 having the groove 107a of fine width.

In the embodiment, if the first film 104 is formed by patterning a single resist layer of a negative type resist, it is easy to obtain the first film 104 having an undercut shape suitable for lift-off. In this case, even if the base layer 101 has a step, it is easy to form the first film 104 over the base layer via the etching stopper film 102 and the film 103 to be patterned. Furthermore, when the negative type resist is a chemically amplified type resist, it is possible to obtain the first film 104 of even smaller width, and as a result, it is possible to make the width of the groove 107a even smaller.

In the embodiment, in the case where the first film 104 has been formed by patterning a single resist layer of a negative type resist, it is quite easy to lift off the first film 104 if the sidewalls of the first film 104 have irregularities due to the standing wave effect. Furthermore, in this case, an angle formed by the diagonally upward slope of each end portion 106b of the etching mask 106 formed through the lift-off method with respect to the top surface of the film 103 underlying the etching mask 106 can be made smaller than in the case where the first film 104 has smooth sidewalls.

In the embodiment, the treatment to reduce the width of the first film 104 is performed between the step of forming the first film 104 and the step of forming the second film 105. Thus, according to the embodiment, it is possible to attain even smaller width of the first film 104, and as a result, even smaller width of the groove 107a of the patterned thin film 107.

An example of the method of forming a patterned thin film according to the embodiment will now be described. In this example, a 2.5-μm-thick alumina ($Al_2O_3$) layer was formed to serve as the base layer 101 on a substrate made of aluminum oxide and titanium carbide ($Al_2O_3$—TiC), and the patterned thin film 107 was formed on the base layer 101 as follows.

On the base layer 101, a 5-nm-thick etching stopper film 102 was formed by sputtering Ta under the following conditions. A DC sputtering device commercially known as VE8295 (product name) of CVC Corporation was used as the sputtering device. A target in the sputtering device was Ta. The output of the sputtering device was 700 W. The sputtering chamber in the sputtering device was supplied with an Ar gas at a flow rate of 10 sccm. An internal pressure of the sputtering chamber was 1.0 mTorr (approximately 0.133 Pa).

Next, a 30-nm-thick film 103 to be patterned was formed by sputtering Au on the etching stopper film 102 using the sputtering device again under the conditions as follows. A target of the sputtering device was Au. The output of the sputtering device was 700 W. The sputtering chamber in the sputtering device was supplied with an Ar gas at a flow rate of 10 sccm. An internal pressure of the sputtering chamber was 1.0 mTorr (approximately 0.133 Pa).

Next, the first film 104 was formed on the film 103 under the following conditions. As the resist, a chemically amplified negative type resist commercially known as TOK TDUR-N620 GP (product name) of Tokyo Ohka Kogyo Co., Ltd. was applied and pre-baked at 80° C. for 60 seconds to thereby form a 0.5-μm-thick resist layer. Next, a stepper (exposure device) commercially known as NSR-TFHEX14C (product name) of Nikon Corporation was used to expose the resist layer to light of specific pattern having passed through an exposure mask, with an numerical aperture (NA) of the lens of 0.6 and a coherence factor σ of 0.75. A latent image was thereby formed on the resist layer. The line width of the exposure mask was 0.2 μm. The coherence factor σ is expressed as $\sigma=NA_1/NA_2$, where $NA_1$ is the numerical aperture of the lens in the lighting optical system as viewed from the reticle side, and $NA_2$ is the numerical aperture of the reducing lens as viewed from the reticle side. $NA_2$ equals NA/m, where 1/m is a reduction ratio of the projection lens. The amount of exposure (dose) was selected within the range of 20 to 55 $mJ/cm^2$, and the width of the first film 104 was adjusted by varying the amount of exposure within this range. Specifically, in this example, prepared were eight samples with amounts of exposure different from one another by 5 $mJ/cm^2$ within the range of 20 to 55 $mJ/cm^2$. The steps described below were performed for all the eight samples. Next, post-exposure bake was performed at 100° C. for 60 seconds, and then development was performed once for 60 seconds using a 2.38% aqueous solution of tetramethylammonium hydroxide as a developer.

Next, the first film 104 was subjected to ashing under the following conditions, to thereby reduce the width of the first film 104. An ashing device commercially known as System 104 (product name) of Matrix Inc. was employed. A pressure inside the ashing chamber was 1.0 Torr (approximately 133 Pa). $O_2$ was used as a gas, at a flow rate of 30 sccm. An RF output was 200 W. A substrate temperature was 70° C. An ashing time was 120 seconds. For the gas, $CF_4$ may be added to $O_2$. The gas may also be ozone. In this case, the ashing may be performed at normal atmospheric pressure.

Next, a 10-nm-thick second film 105 was formed by sputtering Ta over the entire surface on top of the films 103 and 104 under the same conditions as those for the case of forming the films 102 and 103.

Next, the laminate composed of layers from the substrate to the second film 105 was immersed in acetone while being oscillated for one hour, whereby the first film 104 was lifted off (removed). An etching mask 106 was thereby obtained from the second film 105 formed on the film 103.

Next, the film 103 to be patterned was selectively etched through reactive ion etching using the etching mask 106 under the conditions set forth below. The patterned thin film 107 was thereby obtained from the remaining portion of the film 103. An etching device commercially known as HG6000 (product name) of Sumitomo Metals was used. The etching chamber was supplied with an Ar gas at a flow rate of 50 sccm and $O_2$ at a flow rate of 50 sccm. A gas pressure inside the etching chamber was 5 mTorr (approximately 0.665 Pa). A microwave output was 1000 W and an RF output was 50 W. The etching time was 60 seconds.

Figure 10:
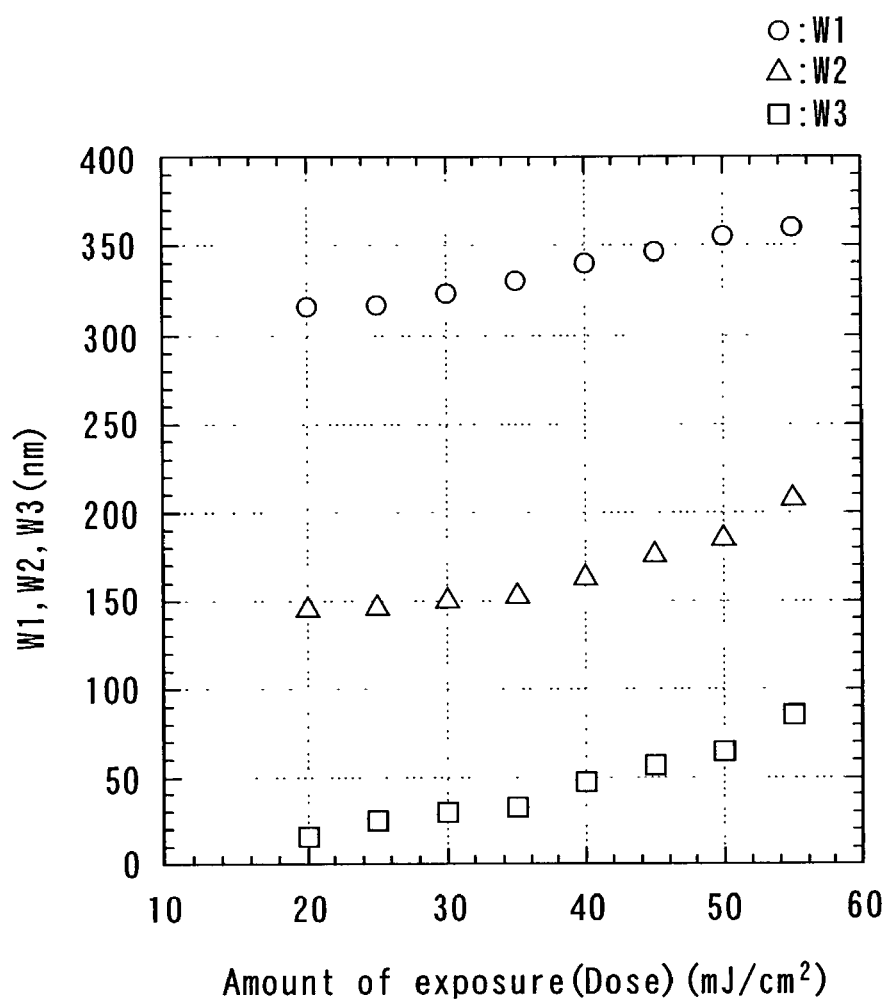
FIG. 10 is a plot showing the measurements of an amount of exposure for a resist layer, the width of the upper portion of the first film before a narrowing treatment, the width of the upper portion of the first film after the narrowing treatment, and the width of the bottom of a groove of a patterned thin film, obtained through an example of the method of forming a patterned thin film according to the embodiment.

In this example, for each of the eight samples with different amounts of exposure for the resist layer for forming the first film 104, the following items were measured: amount of exposure (dose) for the resist layer; the width W1 of the upper portion of the first film 104 before the narrowing treatment, the width W2 of the upper portion of the first film 104 after the narrowing treatment, and the width W3 of the bottom of the groove 107a of the patterned thin film 107. The measurements are shown in the following table and in FIG. 10. In the plot of FIG. 10, circles, triangles, and squares represent the widths W1, W2, and W3, respectively.

TABLE 1

| Amount of exposure (Dose) (mJ/cm$^2$) | W1 (nm) | W2 (nm) | W3 (nm) |
| --- | --- | --- | --- |
| 20 | 315 | 147 | 16 |
| 25 | 316 | 148 | 25 |
| 30 | 323 | 152 | 30 |
| 35 | 330 | 155 | 33 |
| 40 | 340 | 165 | 48 |
| 45 | 346 | 178 | 57 |
| 50 | 355 | 187 | 65 |
| 55 | 360 | 210 | 86 |

Description will now be given of an example in which the method of forming a patterned thin film of the embodiment is applied to a method of fabricating a thin-film magnetic head as a micro device. In this example, described is a thin-film magnetic head that comprises a read head incorporating a spin valve giant magnetoresistive (GMR) element.

Reference is now made to FIGS. 11A to 16A and FIGS. 11B to 16B to describe an outline of the method of fabricating the thin film magnetic head. FIGS. 11A to 16A are cross sections each orthogonal to the air bearing surface. FIGS. 11B to 16B are cross sections of magnetic pole portion each parallel to the air bearing surface.

Figures 11A, 11B:
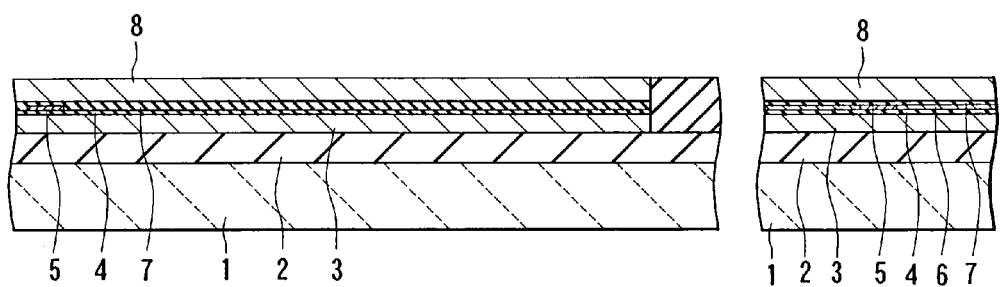
FIGS. 11A and 11B are cross sections for illustrating a step of a method of fabricating a thin-film magnetic head to which the embodiment of the invention is applied.

In the method of fabricating the thin-film magnetic head of this example, first, as shown in FIGS. 11A and 11B, an insulating layer 2 of an insulating material such as alumina (Al$_2$O$_3$) is formed to a thickness of 1 to 5 μm, for example, by sputtering or the like on a substrate 1 of a ceramic material such as aluminum oxide and titanium carbide (Al$_2$O$_3$—TiC). On the insulating layer 2, a bottom shield layer 3 of a magnetic material such as Permalloy (NiFe) is formed to a thickness of about 3 μm, for example, by sputtering, plating or the like, for making the read head.

On the bottom shield layer 3, a bottom shield gap film 4 of an insulating material such as alumina is formed to a thickness of 10 to 200 nm, for example, by sputtering or the like. Then, a GMR element 5 for reproduction and bias field applying layers (not shown) are each formed to a thickness of tens of nanometers on the bottom shield gap film 4. The bias field applying layers are located to be adjacent to both sides of the GMR element 5, and apply a bias magnetic field to the GMR element 5 in the longitudinal direction.

Next, a pair of lead layers 6 are formed on the bias field applying layers by using the method of forming a patterned thin film of the embodiment. The lead layers 6 are arranged to overlap the GMR element 5.

Next, a top shield gap film 7 of an insulating material such as alumina is formed to a thickness of 10 to 200 nm, for example, by sputtering or the like on the bottom shield gap film 4, the GMR element 5 and the lead layers 6.

On the top shield gap film 7, a top-shield-layer-cum-bottom-pole-layer (hereinafter called a bottom pole layer) 8 is formed to a thickness of 3 to 4 μm, for example, by sputtering or plating. The bottom pole layer 8 is made of a magnetic material and used for both read head and write head. The magnetic material used for the bottom pole layer 8 is a soft magnetic material such as NiFe, CoFe, CoFeNi, and FeN.

In place of the bottom pole layer 8, there may be provided a top shield layer, a separation layer made of a nonmagnetic material such as alumina and formed on the top shield layer by sputtering or the like, and a bottom pole layer formed on the separation layer.

Figures 12A, 12B:
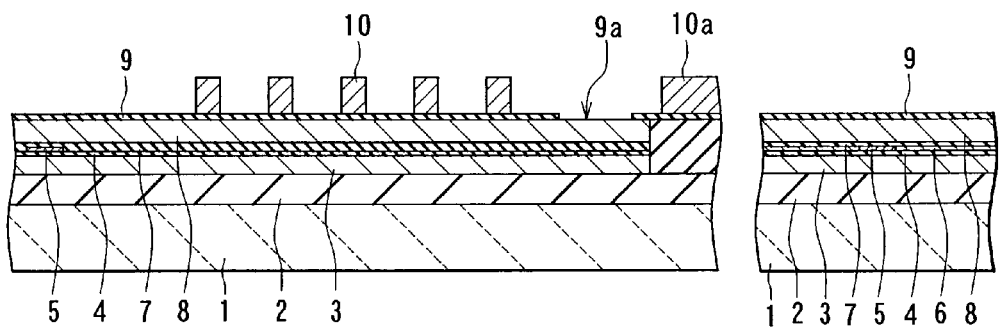
FIGS. 12A and 12B are cross sections for illustrating a step that follows the step shown in FIGS. 11A and 11B.

Next, as shown in FIGS. 12A and 12B, a write gap layer 9 of an insulating material such as alumina is formed on the bottom pole layer 8 to a thickness of 50 to 300 nm, for example, by sputtering or the like. Next, a portion of the write gap layer 9 located in the center portion of a thin-film coil to be described later is etched to form a contact hole 9a for making a magnetic path.

On the write gap layer 9, a first layer 10 of the thin-film coil made of copper (Cu), for example, is formed to a thickness of 2 to 3 μm, for example. In FIG. 12A, reference numeral 10a represents a connecting portion of the first layer 10 to be connected to a second layer 15 of the thin-film coil described later. The first layer 10 of the coil is wound around the contact hole 9a.

Next, as shown in FIGS. 13A and 13B, an insulating layer 11 is formed in a predetermined pattern to cover the first layer 10 of the coil and portions of the write gap layer 9 around the same. The insulating layer 11 is made of an organic insulating material which exhibits fluidity when heated, such as photoresist. Heat treatment is then performed at a predetermined temperature to flatten the surface of the insulating layer 11. As a result of the heat treatment, each of the outer and inner circumferential ends of the insulating layer 11 has a rounded and inclined surface configuration.

On the write gap layer 9 and the insulating layer 11, a track width defining layer 12a of a top pole layer 12 is formed using a magnetic material for making a write head. The track width defining layer 12a extends from an inclined portion of the insulating layer 11 on a side of an air bearing surface 20 (the left side in FIG. 13A) described later to the air bearing surface 20. The top pole layer 12 is made up of the track width defining layer 12a, and a coupling portion layer 12b and a yoke portion layer 12c to be described later. The track width defining layer 12a is formed by plating, for example.

The track width defining layer 12a has an end portion 12a$_1$ and a connecting portion 12a$_2$. The end portion 12a$_1$ is located on the write gap layer 9 and forms the magnetic pole portion of the top pole layer 12. The connecting portion 12a$_2$ is located on the inclined portion of the insulating layer 11 on the side of the air bearing surface 20 and is connected to the yoke portion layer 12c. The width of the end portion 12a$_1$ is equal to the write track width. That is, the end portion 12a$_1$ defines the write track width. The width of the connecting portion 12a$_2$ is greater than that of the end portion 12a$_1$.

Concurrently with the formation of the track width defining layer 12a, the coupling portion layer 12b is formed on the contact hole 9a and a connecting layer 13 is formed on the connecting portion 10a. The coupling portion layer 12b is made of a magnetic material and constitutes a portion of the top pole layer 12 that is magnetically coupled to the bottom pole layer 8. The connecting layer 13 is made of a magnetic material.

Then, the write gap layer 9 and at least part of the magnetic pole portion of the bottom pole layer 8 located on the side of the write gap layer 9 are etched around the track width defining layer 12a, using the track width defining layer 12a as a mask. For example, reactive ion etching is used to etch the write gap layer 9, and ion milling is used to etch the bottom pole layer 8. The resultant structure as shown in FIG. 13B is called a trim structure, in which sidewalls of the magnetic pole portion of the top pole layer 12 (the end portion $12a_1$ of the track width defining layer 12a), the write gap layer 9 and at least part of the magnetic pole portion of the bottom pole layer 8 are formed vertically in a self-aligned manner.

Next, as shown in FIGS. 14A and 14B, an insulating layer 14 of an inorganic insulating material such as alumina is formed over the entire surface to a thickness of 3 to 4 μm, for example. The insulating layer 14 is then polished by chemical mechanical polishing, for example, to expose the track width defining layer 12a, the coupling portion layer 12b and the connecting layer 13, and to flatten the surface.

Figures 15A, 15B:
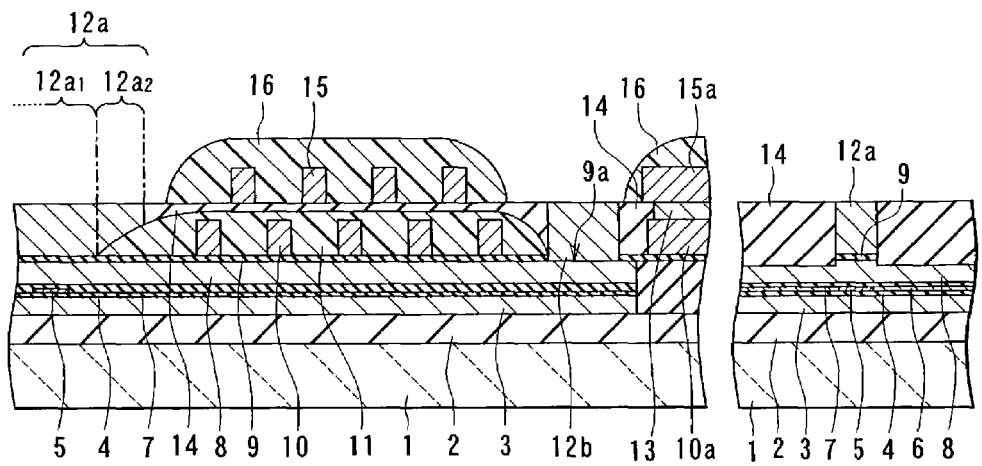
FIGS. 15A and 15B are cross sections for illustrating a step that follows the step shown in FIGS. 14A and 14B.

Next, as shown in FIGS. 15A and 15B, the second layer 15 of the thin-film coil made of copper (Cu), for example, is formed on the flattened insulating layer 14 to a thickness of 2 to 3 μm, for example. In FIG. 15A, reference numeral 15a represents a connecting portion of the second layer 15 that is connected to the connecting portion 10a of the first layer 10 via the connecting layer 13. The second layer 15 is wound around the coupling portion layer 12b.

Next, an insulating layer 16 is formed in a predetermined pattern so as to cover the second layer 15 of the thin-film coil and portions of the insulating layer 14 around the same. The insulating layer 16 is made of an organic insulating material which exhibits fluidity when heated, such as photoresist. Then, heat treatment is performed at a predetermined temperature to flatten the surface of the insulating layer 16. As a result of the heat treatment, each of the inner and outer circumferential ends of the insulating layer 16 has a rounded and inclined surface configuration.

Figures 16A, 16B:
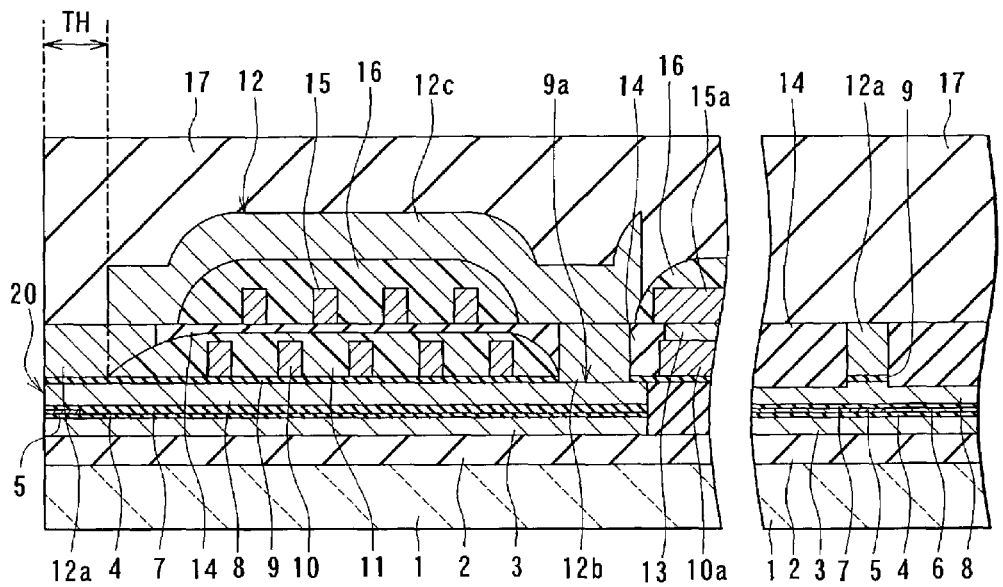
FIGS. 16A and 16B are cross sections for illustrating a step that follows the step shown in FIGS. 15A and 15B.

Next, as shown in FIGS. 16A and 16B, the yoke portion layer 12c is formed on the track width defining layer 12a, the insulating layers 14 and 16 and the coupling portion layer 12b. The yoke portion layer 12c is made of a magnetic material used for making the write head, such as Permalloy, and constitutes a yoke portion of the top pole layer 12. An end of the yoke portion layer 12c facing the air bearing surface 20 is located at a distance from the air bearing surface 20. The yoke portion layer 12c is connected to the bottom pole layer 8 via the coupling portion layer 12b.

Next, an overcoat layer 17 of alumina, for example, is formed to cover the entire surface. Finally, machine processing of the slider including the foregoing layers is performed to form the air bearing surface 20 of the thin-film magnetic head including the write head and the read head. The thin-film magnetic head is thereby completed.

The thin-film magnetic head fabricated as described above comprises a medium facing surface (air bearing surface 20) that faces toward a recording medium, and the read head and the write head (induction-type electromagnetic transducer). The read head incorporates the GMR element 5, and the bottom shield layer 3 and the top shield layer (bottom pole layer 8) for shielding the GMR element 5. Portions of the bottom shield layer 3 and the top shield layer located on a side of the air bearing surface 20 are opposed to each other, the GMR element 5 being located between these portions.

The write head incorporates the bottom pole layer 8 and the top pole layer 12 magnetically coupled to each other, each of which includes at least one layer. The bottom pole layer 8 and the top pole layer 12 include the magnetic pole portions that are opposed to each other and located in regions of the pole layers on a side of the air bearing surface 20. The write head further incorporates the write gap layer 9 provided between the magnetic pole portions of the bottom and top pole layers 8 and 12, and the thin-film coil including the first and second layers 10 and 15, at least part of the coil being disposed between the bottom and top pole layers 8 and 12 and insulated from the bottom and top pole layers 8 and 12. In the thin-film magnetic head of the embodiment, as shown in FIG. 16A, the length from the air bearing surface 20 to the air-bearing-surface-side end of the insulating layer 11 is a throat height TH. The throat height is the length (height) of portions of the two pole layers opposed to each other with the write gap layer in between, as taken from the air-bearing-surface-side end to the other end.

Reference is now made to FIG. 17 through FIG. 23 to describe an example of a method of forming the lead layers 6 of the above-described thin-film magnetic head. FIG. 17 through FIG. 23 are cross sections of the magnetic pole portion each parallel to the air bearing surface (medium facing surface).

Figure 17:
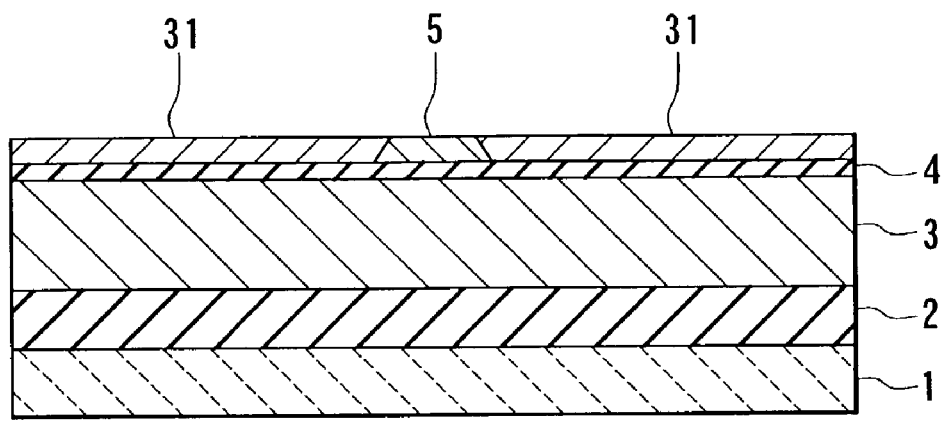
FIG. 17 is a cross section for illustrating a step of a method of forming lead layers to which the embodiment of the invention is applied.

FIG. 17 shows a laminate for use for fabricating a thin-film magnetic head before formation of the lead layers 6. The laminate includes the substrate 1, the insulating layer 2 formed on the substrate 1, the bottom shield layer 3 formed on the insulating layer 2, the bottom shield gap layer 4 formed on the bottom shield layer 3, and the GMR element 5 and the bias field applying layers 31 formed on the bottom shield gap film 4. The GMR element 5 and the bias field applying layers 31 form the base layer for the lead layers 6.

Figure 18:
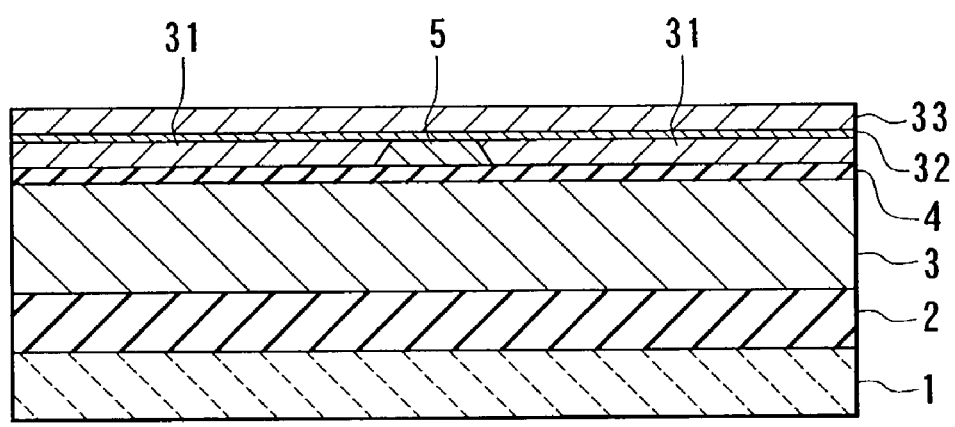
FIG. 18 is a cross section for illustrating a step that follows the step shown in FIG. 17.

In the method of forming the lead layers 6 of this example, as shown in FIG. 18, an etching stopper film 32 and a film 33 to be patterned are formed in this order on the GMR element 5 and the bias field applying layers 31 through sputtering or the like. The etching stopper film 32 is made of Ta, for example, and the film 33 to be patterned is made of Au, for example.

Figure 19:
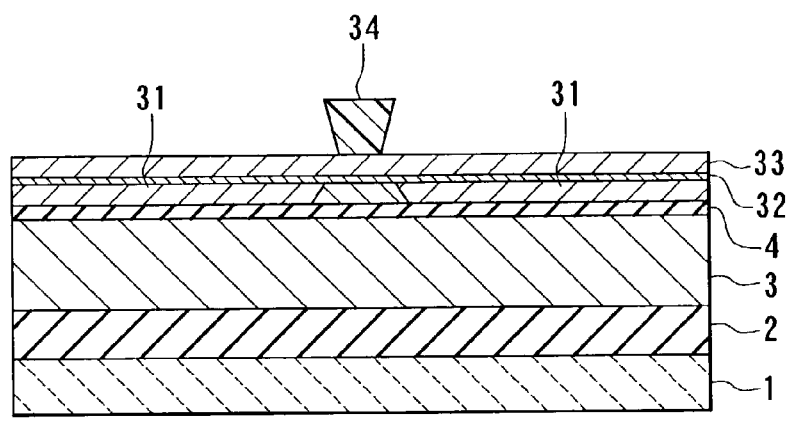
FIG. 19 is a cross section for illustrating a step that follows the step shown in FIG. 18.

Next, as shown in FIG. 19, a patterned first film 34 is formed on the film 33 by patterning a resist through photolithography, for example. Next, the width of the first film 34 is reduced as necessary by ashing, for example.

Figure 20:
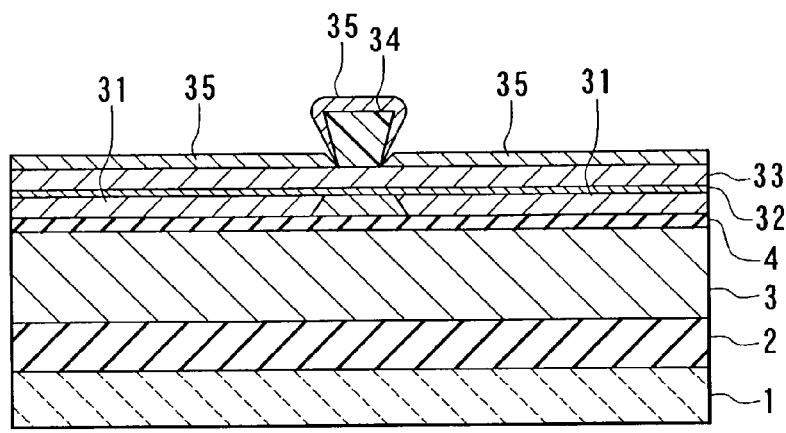
FIG. 20 is a cross section for illustrating a step that follows the step shown in FIG. 19.

Next, as shown in FIG. 20, a second film 35 is formed over the entire surface on top of the film 33 and the first film 34 through sputtering or the like. The second film 35 is made of Ta, for example.

Figure 21:
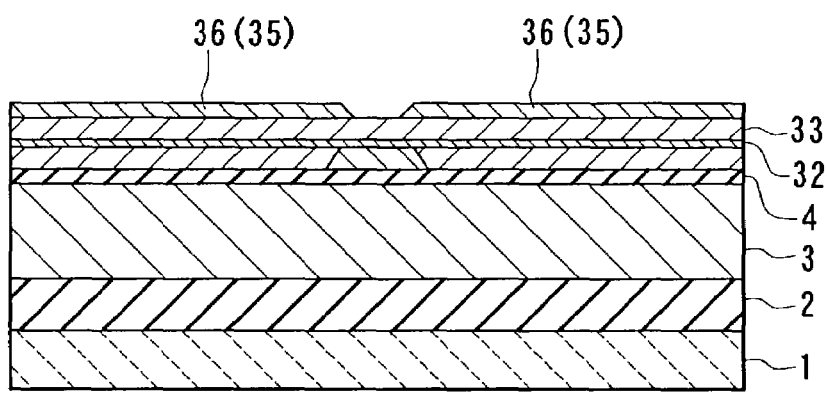
FIG. 21 is a cross section for illustrating a step that follows the step shown in FIG. 20.

Next, as shown in FIG. 21, the first film 34 is lifted off (removed) by, for example, immersing the laminate including the layers from the substrate 1 to the second film 35 in an organic solvent. An etching mask 36 is thereby obtained from the second film 35 formed on the film 33.

Figure 22:
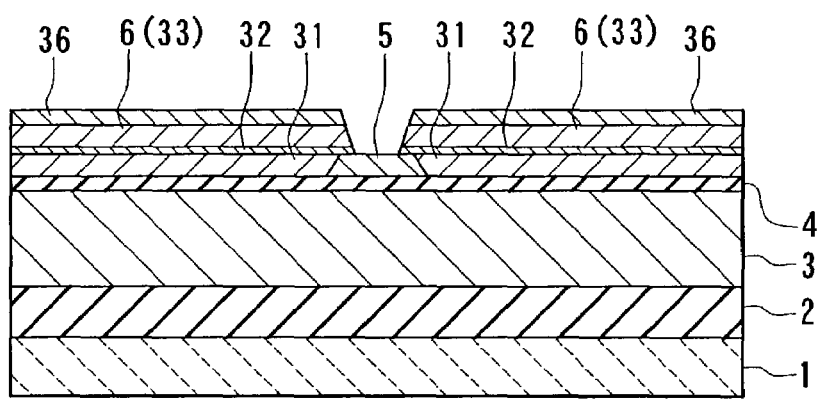
FIG. 22 is a cross section for illustrating a step that follows the step shown in FIG. 21.

Next, as shown in FIG. 22, the film 33 and the etching stopper film 32 are selectively etched through dry etching such as reactive ion etching using the etching mask 36. As a result, the remaining portions of the film 33 make a pair of lead layers 6 as a patterned thin film. There is a groove formed between the pair of lead layers 6.

Figure 23:
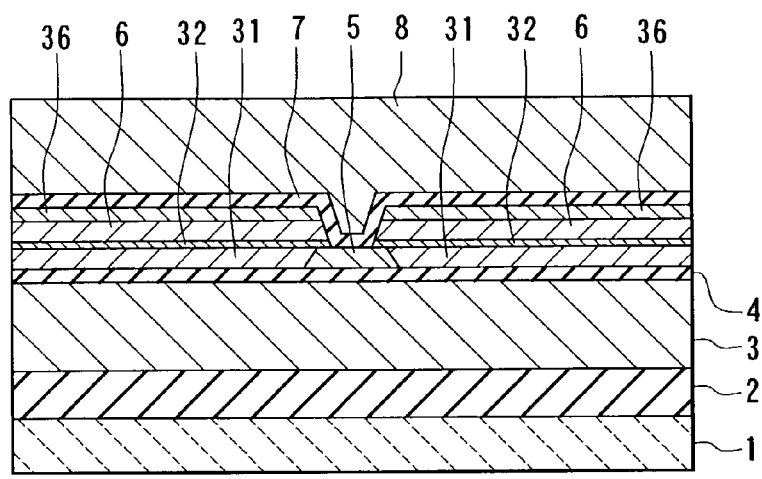
FIG. 23 is a cross section for illustrating a step that follows the step shown in FIG. 22.

Next, as shown in FIG. 23, the top shield gap film 7 is formed to cover the entire top surface of the laminate, and the bottom pole layer 8 is formed on the top shield gap film 7. The subsequent steps for fabrication of the thin-film magnetic head are as described with reference to FIGS. 12A to 16A and FIGS. 12B to 16B.

According to the method of forming the lead layers 6 shown in FIGS. 17 to 23, it is possible to attain a smaller interval between the pair of lead layers 6, and is also possible to allow the top shield gap film 7 to adhere satisfactorily to the end portions of the lead layers 6 facing the groove between the pair of lead layers 6.

A dielectric voltage test was actually conducted on thin-film magnetic head elements each incorporating the lead layers 6 formed under the conditions specified in the example of the method of forming a patterned thin film of the embodiment described above, in order to evaluate a dielectric voltage between the lead layers 6 and the top shield layer (bottom pole layer 8) that is adjacent to the lead layers 6 via the top shield gap film 7. The results revealed that, not only in the case where the interval between the pair of lead layers 6 was 25 nm or more, but also in the case where it was as small as 16 nm, the yield of conforming products in terms of the dielectric voltage was as high as 97% or above for 10,000 thin-film magnetic head elements subjected to the test. Herein, the top shield gap film 7 was a 30-nm-thick alumina film formed through sputtering. In the dielectric voltage test, a DC voltage of 4 V was applied between the lead layers 6 and the top shield layer (bottom pole layer 8) to determine the electrical resistance between those layers. Then, thin-film magnetic head elements exhibiting the electrical resistance of 10 MΩ or higher were judged to be conforming products. In addition, thin-film magnetic head elements each incorporating a pair of lead layers 6 with a 200-nm interval therebetween were fabricated through a method of related art, and a dielectric voltage between the pair of lead layers 6 and the top shield layer (bottom pole layer 8) in those thin-film magnetic head elements was evaluated. As a result, it was revealed that the yield of conforming products in terms of the dielectric voltage was as low as 10% or so for 10,000 thin-film magnetic head elements.

Figure 24:
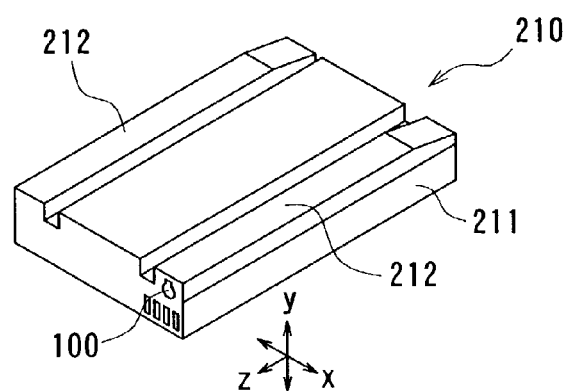
FIG. 24 is a perspective view of a slider incorporated in a head gimbal assembly to which the embodiment of the invention is applied.

Description will now be given of a head gimbal assembly and a hard disk drive to which the present embodiment is applied. First, a slider 210 incorporated in the head gimbal assembly will be described with reference to FIG. 24. In the hard disk drive, the slider 210 is placed to face toward a hard disk platter that is a circular-plate-shaped recording medium to be rotated and driven. The slider 210 has a base body 211 made up mainly of the substrate 1 and the overcoat layer 17 of FIGS. 16A and 16B. The base body 211 is nearly hexahedron-shaped. One of the six surfaces of the base body 211 faces toward the hard disk platter. Rails 212 are formed in this one of the surfaces. A surface of each of the rails 212 functions as the air bearing surface. A tapered portion or a stepped portion is formed near the air-inflow-side end (the end located at the upper right of FIG. 24) of each of the rails 212. When the hard disk platter rotates in the z direction of FIG. 24, an airflow goes into the tapered portion or stepped portion and passes between the hard disk platter and the slider 210. A lift is thus created below the slider 210 in the y direction of FIG. 24 by the airflow and is exerted on the slider 210. The slider 210 flies over the hard disk platter by means of the lift. The x direction of FIG. 24 is across the track of the hard disk platter. A thin-film magnetic head 100 to which the present embodiment is applied is formed near the air-outflow-side end (the end located at the lower left of FIG. 24) of the slider 210.

Figure 25:
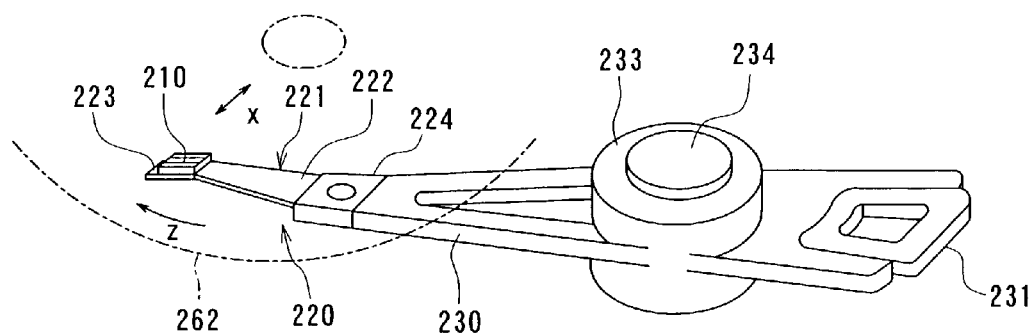
FIG. 25 is a perspective view of a head arm assembly including the head gimbal assembly to which the embodiment of the invention is applied.

Reference is now made to FIG. 25 to describe a head gimbal assembly 220. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator that moves the slider 210 along the x direction across the track of the hard disk platter 262. The actuator incorporates the arm 230 and a voice coil motor that drives the arm 230. A gimbal section that maintains the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a plurality of head gimbal assemblies 220 and a carriage with a plurality of arms is called a head stack assembly, in which the head gimbal assemblies 220 are attached to the arms of the carriage.

FIG. 25 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 26:
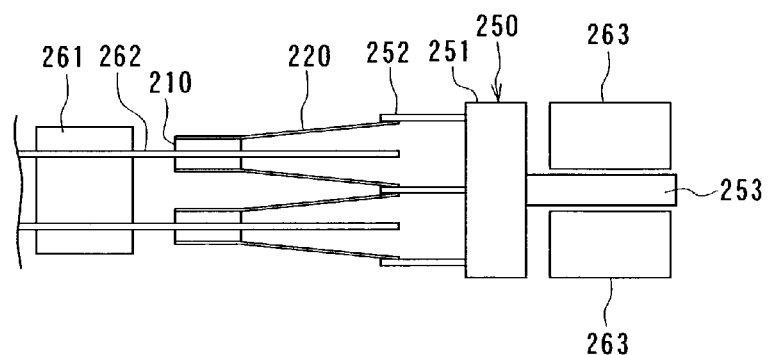
FIG. 26 illustrates a main part of a hard disk drive to which the embodiment of the invention is applied.
Figure 27:
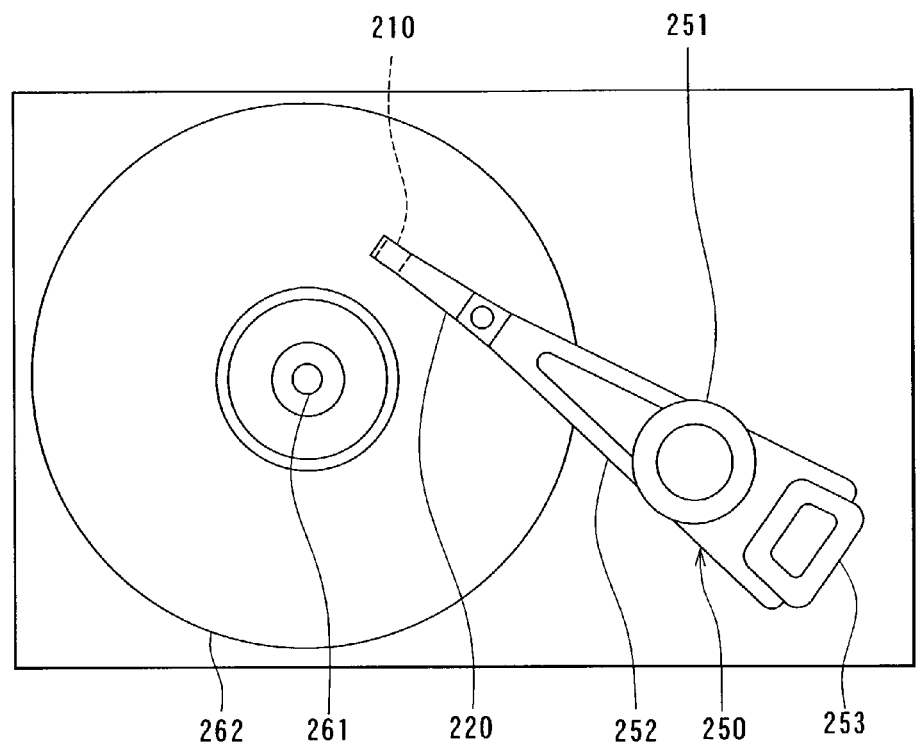
FIG. 27 is a top view of the hard disk drive to which the embodiment of the invention is applied.
Figure 28:
FIG. 28 is a cross section for illustrating a step of an example of a method of fabricating a patterned thin film through dry etching.
Figure 29:
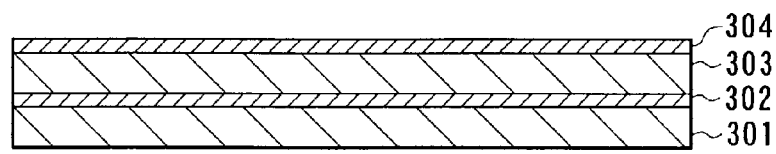
FIG. 29 is a cross section for illustrating a step that follows the step shown in FIG. 28.
Figure 30:
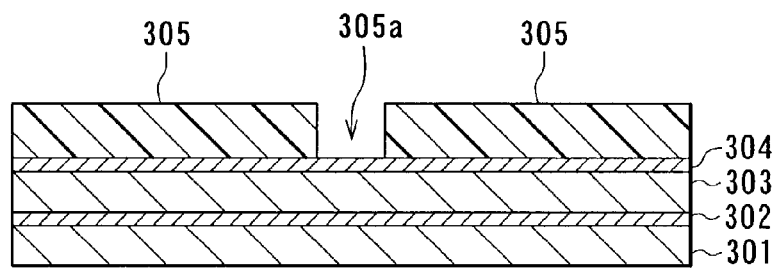
FIG. 30 is a cross section for illustrating a step that follows the step shown in FIG. 29.
Figure 31:
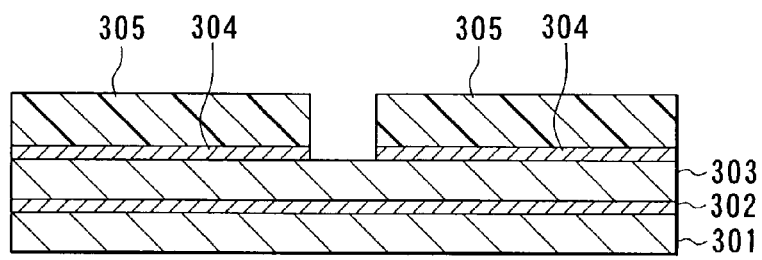
FIG. 31 is a cross section for illustrating a step that follows the step shown in FIG. 30.
Figure 32:
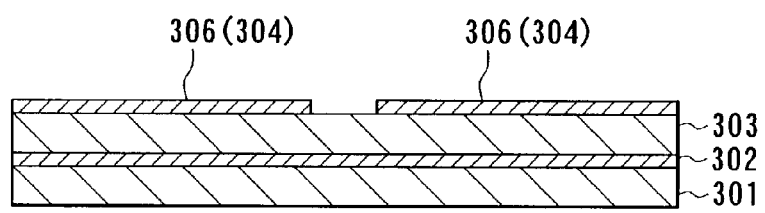
FIG. 32 is a cross section for illustrating a step that follows the step shown in FIG. 31.
Figure 33:
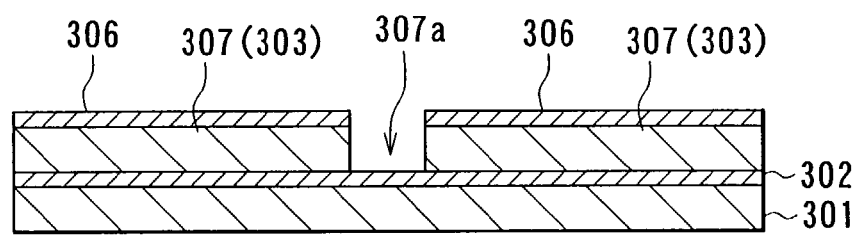
FIG. 33 is a cross section for illustrating a step that follows the step shown in FIG. 32.
Figure 34:
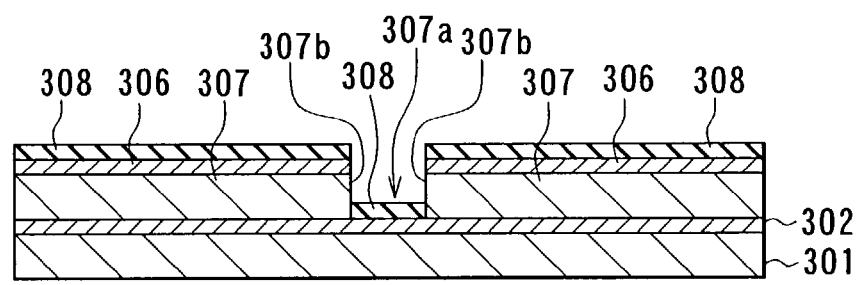
FIG. 34 is a cross section showing a state where another thin film is formed on the laminate shown in FIG. 33.

Reference is now made to FIG. 26 and FIG. 27 to describe an example of the head stack assembly and the hard disk drive. FIG. 26 illustrates the main part of the hard disk drive. FIG. 27 is a top view of the hard disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 face each other with each of the platters 262 in between. The voice coil motor includes permanent magnets 263 located to face each other, the coil 253 of the head stack assembly 250 being placed between the magnets 263.

The head stack assembly 250 except the slider 210 and the actuator support the slider 210 and align it with respect to the hard disk platter 262.

In this hard disk drive, the actuator moves the slider 210 across the track of the hard disk platter 262 and aligns the slider 210 with respect to the hard disk platter 262. The thin-film magnetic head incorporated in the slider 210 writes data on the hard disk platter 262 through the use of the write head and reads data stored on the hard disk platter 262 through the use of the read head.

The present invention is not limited to the aforementioned embodiment but may be practiced in still other ways. For example, the invention is also applicable to a method of fabricating micro devices other than a thin-film magnetic head, such as a semiconductor device and a sensor or actuator incorporating a thin film.

As described so far, in the method of forming a patterned thin film of the invention, the film to be patterned is formed on the base layer; the patterned first film is formed on the film to be patterned; and the second film is formed over the entire surface on top of the film to be patterned and the first film. Then, by removing the first film, the etching mask is obtained from the second film formed on the film to be patterned. Using this etching mask, the film to be patterned is selectively etched through dry etching. A patterned thin film having a groove is thereby obtained. The invention allows reduction in the width of the first film that determines the width of the groove of the patterned thin film. It is therefore possible to obtain a patterned thin film having a groove of fine width. Furthermore, according to the invention, the end portions of the patterned thin film facing the groove form upward slopes. It is therefore possible to attain good adhesion of another thin film to those end portions of the patterned thin film.

In the method of forming a patterned thin film of the invention, the first film may be formed by patterning a single resist layer made of a negative type resist in the step of forming the first film. In this case, it is possible to easily obtain the first film having an undercut shape suitable for lift-off.

In the method of forming a patterned thin film of the invention, the negative type resist may be a chemically amplified type resist. In this case, it is possible to obtain the first film of even smaller width, and consequently, it is possible to attain even smaller width of the groove of the patterned thin film.

In the method of forming a patterned thin film of the invention, the first film may have sidewalls on which irregularities are formed due to a standing wave effect. In this case, it is easy to lift off (remove) the first film. Furthermore, in this case, it is possible to attain good adhesion of another thin film to the end portions of the patterned thin film facing the groove.

In the method of forming a patterned thin film of the invention, the step of reducing the width of the first film may be interposed between the step of forming the first film and the step of forming the second film. In this case, it is possible to obtain the first film of even smaller width, and consequently, it is possible to attain even smaller width of the groove of the patterned thin film.

In the method of fabricating a micro device of the invention, patterned thin film(s) are formed by the method of forming a patterned thin film of the invention. It is therefore possible to obtain patterned thin film(s) having a groove of fine width, and also to attain good adhesion of another thin film to the end portions of the patterned thin film facing the groove.

Obviously many modifications and variations of the present invention are possible in the light of the above teachings. It is therefore to be understood that within the scope of the appended claims the invention may be practiced otherwise than as specifically described.

What is claimed is:

1. A method of forming a patterned thin film, comprising the steps of:
   forming a film to be patterned on a base layer;
   forming a patterned first film on the film to be patterned, the patterned first film having a top surface and sidewalls;
   forming a second film over an entire surface on top of the film to be patterned and the patterned first film and on the sidewalls of the patterned first film;
   obtaining an etching mask from the second film formed on the film to be patterned, by removing the patterned first film; and
   forming a patterned thin film by selectively etching the film to be patterned, through dry etching using the etching mask,
   wherein the etching mask has an opening at a position where the patterned first film was present, and has end portions facing the opening, the end portions forming diagonally upward slopes,
   the patterned thin film has a groove at a position corresponding to the opening of the etching mask, and has end portions facing the groove, the end portions forming diagonally upward slopes,
   the patterned first film has an undercut.

2. A method of forming a patterned thin film according to claim 1, wherein the patterned first film is formed by patterning a single resist layer made of a negative type resist in the step of forming the patterned first film.

3. A method of forming a patterned thin film according to claim 2, wherein the sidewalls of the patterned first film have irregularities formed due to a standing wave effect.

4. A method of forming a patterned thin film according to claim 2, wherein the negative type resist is a chemically amplified type resist.

5. A method of forming a patterned thin film according to claim 1, further comprising the step of forming a second thin film after the patterned thin film is formed, such that the second thin film covers a top surface of a laminated structure including the base layer and the patterned thin film and adheres to the end portions of the patterned thin film.

6. A method of forming a patterned thin film according to claim 1, further comprising the step of reducing the patterned first film in width, the step being interposed between the step of forming the patterned first film and the step of forming the second film.

7. A method of forming a patterned thin film according to claim 6, wherein the patterned first film is subjected to ashing in the step of reducing the patterned first film in width.

8. A method of forming a patterned thin film according to claim 1, wherein the film to be patterned is selectively etched through reactive ion etching in the step of forming the patterned thin film.

9. A method of forming a patterned thin film according to claim 1, wherein an etching rate for the etching mask when the film to be patterned is etched is smaller than an etching rate for the film to be patterned.

10. A method of fabricating a micro device including one or more patterned thin films, comprising the steps of:
    forming a film to be patterned on a base layer;
    forming a patterned first film on the film to be patterned, the patterned first film having a top surface and sidewalls;
    forming a second film over an entire surface on top of the film to be patterned and the patterned first film and on the sidewalls of the patterned first film;
    obtaining an etching mask from the second film formed on the film to be patterned, by removing the patterned first film; and
    forming a patterned thin film by selectively etching the film to be patterned, through dry etching using the etching mask,
    wherein the etching mask has an opening at a position where the patterned first film was present, and has end portions facing the opening, the end portions forming diagonally upward slopes,
    the patterned thin film has a groove at a position corresponding to the opening of the etching mask, and has end portions facing the groove, the end portions forming diagonally upward slopes,
    the patterned first film has an undercut.

11. A method of fabricating a micro device according to claim 10, wherein the micro device is a thin-film magnetic head.

12. A method of fabricating a micro device according to claim 11, wherein the thin-film magnetic head includes a magnetoresistive element and lead layers connected to the magnetoresistive element, and the patterned thin film forms the lead layers.

13. A method of forming a patterned thin film according to claim 5, wherein the second thin film is an insulating film.

14. A method of fabricating a micro device according to claim 10, further comprising the step of forming a second thin film after the patterned thin film is formed, such that the second thin film covers a top surface of a laminated structure including the base layer and the patterned thin film and adheres to the end portions of the patterned thin film.

15. A method of fabricating a micro device according to claim 14, wherein the second thin film is an insulating film.

16. A method of fabricating a micro device according to claim 10, wherein the patterned first film is formed by patterning a single resist layer made of a negative type resist in the step of forming the patterned first film.

17. A method of fabricating a micro device according to claim 16, wherein the sidewalls of the patterned first film have irregularities formed due to a standing wave effect.

* * * * *